United States Patent Office 3,493,551
Patented Feb. 3, 1970

3,493,551
METHOD OF SUSPENSION POLYMERIZING VINYL MONOMERS
Eiji Aoishi and Itaru Hatano, Kobe, Japan, assignors to Kanegafuchi Chemical Industry Company, Limited, Osaka, Japan, a corporation of Japan
No Drawing. Filed Jan. 23, 1967, Ser. No. 610,815
Claims priority, application Japan, Mar. 23, 1966, 41/18,181
Int. Cl. C08f *15/22, 19/10*
U.S. Cl. 260—85.5                                    12 Claims

ABSTRACT OF THE DISCLOSURE

A suspension stabilizer for use in the suspension polymerization of vinyl monomers, the suspension stabilizer including a calcium phosphate medium which is relatively insoluble in water and an oil soluble organic phosphite including carbon groups having more than ten carbon atoms and which is relatively resistant to hydrolyzation.

---

This invention relates generally to improvements in methods of suspension polymerization of vinyl monomers, and more particularly to the suspension stabilizer used in the suspension polymerization system.

In the suspension polymerization of vinyl monomers, it is conventional practice to use an agent for stabilizing the polymerization system, usually referred to as a suspension stabilizer.

The suspension stabilizers now in use may be roughly classified in two groups, water soluble high molecular organic polymers (such as polyvinyl alcohol and polyvinylpyrrolidone) and water insoluble organic or inorganic metal salts (such as calcium phosphate, magnesium phosphate, magnesium hydroxide, zinc oxide, barium sulphate, calcium oxalate, and calcium citrate).

When water soluble high molecular organic polymers are used as a suspension stabilizer, some parts of the monomers in the polymerization system are invariably emulsified and some parts of the suspension stabilizer adhere to the polymer formed, with the result that the polymer particles bond to each other. Therefore, using water soluble high molecular organic polymers, the polymerization system becomes inefficient in both quantity and quality of the end product.

In the use of water insoluble organic or inorganic metal salts, the disadvantages noted above in connection with water soluble high molecular organic polymers may be overcome, but other undesirable side effects are created Since the side effects produced by various of the water insoluble organic or inorganic metal salts differ from one another, the side effect characteristics of this group of suspension stabilizers are not capable of definition in general terms. Calcium phosphates are widely used, are mainly representative of water insoluble organic or inorganic metal salts used as suspension stabilizers, and are a part of the ingredients of the suspension stabilizer of this invention, so the undesirable side effects of calcium phosphates as an ingredient of previous suspension stabilizers will be emphasized.

When calcium phosphates are used as an ingredient of heretofore proposed suspension stabilizers, the polymerization conditions, such as temperature, rate, agitation, etc., are narrowly restricted, and polymerization is practical only within a very limited range of specified conditions; the stability of the suspension system under similar polymerization conditions cannot be readily reproduced; a large amount of calcium phosphate is required to be used; and part of the materials used in the suspension stabilizer tend to remain a part of the polymer particles, resulting in a deterioration of the properties of the end polymer sought.

In order to overcome the undesirable side effects of calcium phosphates in the suspension stabilizer, it has been conventional practice to also include an anion surface active agent such as sodium dodecylbenzene sulfonate or sodium dodecylsulfate with calcium phosphates and other water insoluble metal salts. Use of anion surface active agents has not proven to be a solution for the various problems because of the fact that the quantity of anion surface active agent used had to be rigidly controlled; some parts of the monomers in the system would invariably be emulsified, causing the emulsified polymer to adhere to the walls of the autoclave, use of an excessive amount of an anion surface active agent acting to destroy the stability of the suspension polymerization system rather than to act in stabilizing the same, with resultant decrease in the yield of the polymerization system; extreme technological skill is required to increase the diameters of the polymer particles; and the suspension stabilizer has a tendency to be retained in the polymer particles, resulting in a deterioration of color, transparency, etc.

The primary object of the present invention is thus to provide a suspension stabilizer for the suspension polymerization of vinyl monomers which avoids the undesirable side effects provided by previously used suspension stabilizers. The basic manner in which this is attained is by use of a suspension stabilizer including an oil soluble organic phosphite and a calcium phosphate medium.

Other objects and advantages of the invention will be apparent during the course of the following detailed description.

The suspension stabilizer of the present invention may be used in connection with suspension polymerization of a general range of vinyl monomers. This would include, but is not limited to, such general vinyl monomers as styrene, methyl methacrylate, acrylonitrile, vinyl, vinylidene chloride, and styrene derivatives such as chlorostyrene and alpha-methyl styrene. Such vinyl monomers may be used either singly or in mixtures, as is well known in the art.

The calcium phosphate medium preferably used in our invention comprises calcium phosphates which are relatively insoluble in the water contained in the polymerization system. The calcium phosphates which we have found to provide optimum results include calcium monohydrogen phosphate, tricalcium phosphate, hydroxyl apatite, and mixtures of the same. The calcium phosphates may be in a granular particulate form, or may be prepared by synthesization either inside or outside of the polymerization system. When the calcium phosphate medium is synthesized by reacting an aqueous solution of calcium chloride and an aqueous solution of sodium phosphate, the calcium phosphate medium formed is a mixture of tricalcium phosphate and hydroxyl apatite-3$(Ca_3(Po_4)_2 \cdot Ca(OH)_3$.

It is obvious that the greater the purity of the suspension stabilizer, and thus the calcium phosphate medium which is a part thereof, the better the end result. Thus, when the calcium phosphates are granular, particle diameter of less than $30\mu$ is preferable, since the smaller the particle size, the greater the area of the particle which makes contact with the monomer, resulting in a larger polymer particle. In the case of synthesization of calcium phosphates, the same may be attained exteriorly of the polymerization system by intermixing an aqueous solution of sodium phosphate and an aqueous solution of calcium chloride, or the polymerization system may be charged with an aqueous solution of sodium phosphate and an aqueous solution of calcium chloride. In cases of synthesization, the ratio of sodium phosphate and calcium chloride is preferable in excess of calcium chloride, but may be varied up to 20% in excess of sodium phosphate of the molecular equivalent for the replacement of the sodium ion with the calcium ion.

The amount of calcium phosphate medium used in our suspension stabilizer will be largely dependent upon the type of vinyl monomer used in the polymerization system, and will also be dependent on polymerization conditions. For all practical purposes, the suspension stabilizer must have a calcium phosphate medium content of more than 0.05% by weight of the monomers used. In usual cases, 0.2%–1.0% by weight will provide optimum results. If the amount of calcium phosphate medium exceeds 5% by weight of the monomers used, the polymer particles produced will have greatly deteriorated qualities.

The oil soluble organic phosphite of our improved suspension stabilizer is preferably a phosphorous ester that is relatively resistant to hydrolyzation in the polymerization system and includes carbon groups having more than 10 carbon atoms, such as those of the aliphatic or aromatic hdrocarbon groups. Oil soluble organic phosphites which have been found suitable for use in our improved suspension stabilizer include alkyl esters of phosphorous acid such as myristyl esters of phosphorous acid, stearyl esters of phosphorous acid, lauryl ester of phosphorous acid, and mixtures of the same; and esters of phosphorous acid with a lipophilic group having aromatic rings, such as lauryl phenyl, and myristyl phenyl. Of the oil soluble organic phosphites which may be used as a part of our suspension stabilizer, we have found optimum results to be provided by tristearyl phosphite, distearyl phosphite, trilauryl phenyl phosphite, and mixtures of the same. The quantity of the oil soluble or- organic phosphite used in our suspension stabilizer is preferably greater than 0.01% by weight of the calcium phosphate medium used and less than 20% by weight of the calcium phosphate medium used, although certain instances may require use of more than 20% oil soluble organic phosphites, as will be readily understood by those skilled in the art.

In adding the calcium phosphate medium and oil soluble organic phosphite to the polymerization system, the preferred procedure is to add the total amount before starting polymerization. As an alternative to initial addition of the suspension stabilizer, part may be added at the start of polymerization, and the remainder added thereafter continuously or step by step before formation of the final spectrum condition of the polymer particles produced.

In the use of our improved suspension stabilizer, polymerization is carried out in conventional manners which have heretofore been followed in the suspension polymerization of vinyl monomers. As is conventional, water may be used as a medium, as the initiator, the usual initiators for suspension polymerization may be used, such as lauryl peroxide, benzol peroxide, t-butyl perisobutylate, azobisisobutyronitrile, etc. Polymerization is carried out at the usual temperatures, that is, over 50° C., for approximately the same period of time as previously used.

In order to provide a comparative analysis of the results attained by use of our improved suspension stabilizer, a particular formula for suspension polymerization was selected, the same being applicable to Tables 1–5, and the suspension stabilizer used was varied. This formula comprised reacting 70 parts styrene, 30 parts acrylonitrile, and 0.3 part benzoyl peroxide in 200 parts aqueous medium at 80° C., for 3 hours, and further at 90° C., for 3 hours, the suspension stabilizer being selected and added as indicated in the various tables.

TABLE 1

| Calcium phosphate medium (parts by weight total monomers) | Oil soluble organic phosphite (parts by weight total monomers) | Anion surface active agent (parts by weight total monomers) | Suspension stability |
|---|---|---|---|
| Tricalcium phosphate, 1.0. | 0.008 | | Stable. |
| Do | 0.01 | | Do. |
| Do | | 0.008 | Do. |
| Do | | | Agglomerates, unstable. |

NOTE.—In this comparative analysis, calcium phosphate was synthesized by reacting an aqueous solution of calcium chloride and an aqueous solution of sodium phosphate, providing the calcium phosphate medium of column 1 of the table; the oil soluble organic phosphite noted in column 2 of Table 1 was tristearyl phosphite, and the anion surface active agent noted in column 3 of Table 1 was sodium dodecylbenzene sulfonate.

TABLE 2

| Calcium chloride/Sodium phosphate (equivalent ratio) | Oil soluble organic phosphite (parts by weight total monomers) | Anion surface active agent (parts by weight total monomers) | Suspension stability | Transparency of the particle | Formation of emulsified product |
|---|---|---|---|---|---|
| 125/100 | 0.006 | | Stable | Transparent particle | Absent. |
| 125/100 | 0.50 | | do | do | Do. |
| 125/100 | | 0.005 | do | do | Nearly absent. |
| 125/100 | | 0.10 | Rather unstable | Opaque particle | Heavy. |
| 125/100 | | | Agglomerates, unstable | | |
| 100/120 | 0.02 | | Stable | Transparent particle | Absent. |
| 100/120 | | 0.008 | Agglomerates, unstable | | |

NOTE.—The calcium phosphate medium, oil soluble organic phosphite and anion surface active agent used in polymerization shown in Table 2 is the same as used in Table 1, Table 2 showing the polymerization may be conducted under a wide range of conditions without contaminating the product yielded by the formation of emulsified polymers. That is, the amount of oil soluble organic phosphite used may be widely varied, and, in synthesizing the calcium phosphate medium, the proportions of sodium phosphate and calcium chloride may be widely varied.

The amount of calcium phosphate medium formed in the mixture mentioned above was 0.5 part by weight of the monomers used in each case of 125/100 and 100/120.

The notation "unstable" refers to a condition in which a part of the particles are not in a true sphere, but agglutinate together.

TABLE 3

| Tricalcium phosphate (parts by weight total monomers) | Oil soluble organic phosphite (parts by weight total monomers) | Anion surface active agent (parts by weight total monomers) | Less than 200 mesh (weight percent) | More than 32 mesh (weight percent) | Average diameter of particles (mm.) |
|---|---|---|---|---|---|
| 0.30 | 0.02 | | 0.50 | 2.25 | 0.213 |
| 0.50 | 0.005 | | 1.67 | 0.50 | 0.291 |
| 0.50 | 0.04 | | 9.7 | | 0.116 |
| 0.50 | | 0.008 | 46.3 | | 0.053 |
| 0.30 | | 0.005 | 34.6 | | 0.087 |
| 0.20 | | 0.005 | 42.3 | | 0.088 |

NOTE.—The oil soluble organic phosphite and anion surface active agent as noted respectively in columns 2 and 3 of Table 3 are the same as used in connection with the mixture of Table 1.

It will thus be seen that the particle diameter of the polymer particles may be easily regulated according to that desired. The reason for this is not clear, but as shown by the table, the particle diameter may be regulated by varying the quantity of the ingredients of the suspension stabilizer.

TABLE 4

| Calcium phosphate medium (parts by weight total monomers) | Oil soluble organic phosphite (parts by weight total monomers) | Anion surface active agent (parts by weight total monomers) | Suspension stability |
|---|---|---|---|
| Calcium monohydrogen phosphate, 0.50. | 0.02 | | Stable. |
| Do | | 0.008 | Agglomerates, unstable. |
| Do | | | Do. |

NOTE.—In conventional methods of suspension of polymerization, monohydrogen calcium salt cannot be used as a part of the suspension stabilizer without causing difficulties. Up to this time, the only calcium phosphates which were known to be useable in a suspension stabilizer were those containing calcium in excess of the equivalent of the counterpart phosphate radical. Accordingly, our invention has expanded the range of calcium phosphates useable in suspension stabilizers.

TABLE 5

| Water insoluble inorganic salt (parts by weight total monomers) | Oil soluble organic phosphite (parts by weight total monomers) | Suspension stability | Transparency of particles |
|---|---|---|---|
| Calcium oxalate, 0.50 | 0.02 | Rather unstable. | Opaque. |
| Calcium citrate, 0.50 | 0.02 | do | Do. |
| Zinc oxide, 0.50 | 0.02 | do | Do. |
| Barium sulfate 0.50 | 0.02 | do | Do. |
| Calcium phosphate, 0.50. | 0.02 | Stable | Transparent. |

NOTE.—The product yielded by our suspension stabilizer which includes a calcium phosphate medium and an oil soluble organic phosphite has excellent qualities, good transparency, and is lacking in a formation of colored materials, even when large amounts of an oil soluble organic phosphite is used, as shown by the previous tables, particularly Table 2. However, when other heretofore used water insoluble organic and inorganic metal salts, such as calcium oxalate, calcium citrate, zinc oxide and barium sulphate were used, together with an oil soluble organic phosphite, the particles obtained were opaque and not of the same quality as those obtained with use of a calcium phosphate medium. Thus, when the water-insoluble inorganic salts noted in the Table 5 are used, the suspension system agglomerates and is unstable just as when a calcium phosphate medium is used without an oil soluble organic phosphite.

Examples of various suspension polymerization of vinyl monomers, given without limitation has to the scope of this invention, are as follows:

EXAMPLE 1

852.3 cc. distilled water and 125 cc. of a 2.12% trisodium phosphate solution were charged in a four necked flask of 2 liter capacity equipped with a stirrer, refluxing cooler and a thermometer. While vigorously stirring, 22.7 cc. of a 15.1% calcium chloride solution was added drop by drop to synthesize 2.5 g. tricalcium phosphate. To this mixture was added a mixture made up of 150 g. acrylonitrile, 350 g. styrene, 2.5 g. lauroyl peroxide and 0.04 g. tristearyl phosphite. The prepared mixture was heated to 75° C. under agitation in a nitrogen current. After heating under agitation for 3 hours at this temperature, the temperature was raised to 82° C. and this temperature was maintained for 3 hours. The polymerization reaction was thus completed 6 hours after initation. The polymerization system was stable, produced large polymer particles, and was entirely free from mutual conglutination and adherence.

The temperature of the reaction system was dropped below 40° C., 10 cc. of concentrated hydrochloric acid was added, and after stirring for about 30 minutes, the precipitate was filtered and dried. The product obtained was 463 g. of a transparent acrylonitrile-styrene copolymer having an average particle diameter of 2.29 mm.

EXAMPLE 2

852.3 cc. distilled water and 143.7 cc. of 2.12% trisodium phosphate solution were charged in a flask as set forth in Example 1 and, while vigorously stirring, 19.8 cc. of a 15.1% calcium chloride solution was added drop-by-drop to synthesize 2.5 g. of calcium phosphate, it being noted that the amount of trisodium phosphate added was thus 15% in excess of the equivalent, the vinyl monomers and initiator added as set forth in Example 1, and 1.0 g. distearyl phosphite was added. The prepared mixture was heated and agitated in the same manner as set forth in Example 1.

The polymerization system was stable, the polymer particles were large and transparent and free from conglutination. The product obtained was 454 g. of acrylonitrile-styrene copolymer having an average particle diameter of 0.18 mm.

EXAMPLE 3

Suspension polymerization was carried out using the same mixtures as set forth in Example 1, except that 1000 cc. distilled water was used; the calcium phosphate medium was supplied by adding 5 g. fine powder of commercial tricalcium phosphate that was passable through a 200 mesh screen rather than synthesization of the calcium phosphate medium as set forth in Example 1, and the amount of tristearyl phosphite was increased to 0.1 g.

The polymerization was stable, and the polymer particles were large and transparent, free of mutual conglutination and agglomeration.

The product obtained was 472 g. of acrylonitrile styrene copolymer having an average particle diameter of 0.23 mm.

EXAMPLE 4

Suspension polymerization was carried out using the same ingredients as set forth in Example 1, except that 927.2 cc. of distilled water was used; the calcium phosphate medium was provided by intermixing an aqueous solution of 52.2 cc. of a 5% aqueous solution of disodium hydrogen phosphate and 20.6 cc. of a 15.1% calcium chloride aqueous solution, providing an initial charge of 1000 cc. of a suspension containing 2.5 g. of calcium monohydrogen phosphate; and the amount of tristearyl phosphite was increased to 0.1 g. Polymerization was then carried out in the same manner as set forth in Example 1.

The suspension polymerization system was stable, the polymer particles were large, and did not mutually conglutinate nor adhere together.

EXAMPLE 5

A 1000 cc. suspension containing the calculated amount of 2.5 g. of tricalcium phosphate was prepared in the same way as set forth in Example 1. A monomer mixture containing 500 g. styrene, 1.5 g. benzoylperoxide and 0.1 g. tristearyl phosphite was introduced. This preparation was heated to 90° C. with violent agitation in a nitrogen current, and this temperature was maintained for 6 hours to complete polymerization. The polymerization system was stable, the polymer particles were large, and did not mutually agglutinate.

The reaction system was cooled down, 15 cc. concentrated hydrochloric acid was added, and the mixture was stirred for about 30 minutes. The polymer was precipitated, filtered, washed and dried, yielding perfectly spherical and transparent polymer. The average particle diameter was 0.20 mm.

EXAMPLE 6

A 1000 cc. suspension containing the calculated amount of 2.5 g. of tricalcium phosphate was prepared in the same way as set forth in Example 1. A monomer mixture containing 500 g. methyl methacrylate, 1.5 g. benzoylperoxide and 0.1 g. trilauryl phenyl phosphite was introduced. The preparation was heated to 80° with a violent agitation in a nitrogen current, and this temperature was maintained for 4 hours to complete polymerization. The polymerization system was stable and the polymer particles were large, and did not agglomerate. 486 g. of truly spherical and transparent methyl methacrylate polymer particles were obtained, the average particle diameter being 0.18 mm.

EXAMPLE 7

653.4 cc. distilled water and 62.5 cc. of a 6.36% trisodium phosphate solution were charged in similar apparatus as employed in Example 1. Under violent agitation, 34.1 cc. of a 15.1% calcium chloride solution was gradually added drop-by-drop to synthesize 6.25 g. of a calcium phosphate suspension. 2.25 g. benzoyl peroxide and 0.225 g. tristearyl phosphite were dissolved in a monomer mixture of 225 g. styrene and 525 g. methyl methacrylate. The mixture prepared was led into the reaction kettle and was heated to 80° C. under violent agitation in a nitrogen current. After stirring was continued for 3 hours at this temperaure, the temperature was raised to 90° C. and held for 3 hours to complete the polymerization reaction.

The stability of the polymerization system was good, the polymer particles were large and did not adhere together.

After the reaction was completed, temperature of the system was cooled to below 40° C., 25 cc. concentrated hydrochloric acid was added, and the system was stirred for about 15 minutes. The polymer was precipitated, filtered, washed and dried, yielding 702 g. transparent polymer. The average particle diameter was 0.30 mm.

Various changes may be made in the form of the invention herein described without departing from the spirit of the invention or the scope of the following claims.

We claim:

1. The method of manufacturing polymer particles by the suspension polymerization of vinyl monomers in a substantially stabilized polymerization system wherein the suspension stabilizer includes a calcium phosphate medium which is relatively insoluble in water, the suspension stabilizer having a calcium phosphate medium content of from 0–05% to 5.0% by weight of the monomers used, and an oil soluble organic phosphite including carbon groups having more than 10 carbon atoms and which is relatively resistant to hydrolyzation, the suspension stabilizer have an oil soluble organic phosphite content of more than 0.01% and less than 20% by weight of the calcium phosphate medium used.

2. The method as specified in claim 1 wherein the calcium phosphate medium is selected from a group consisting of calcium monohydrogen phosphate, tricalcium phosphate, hydroxyl apatite, and mixtures thereof.

3. The method as specified in claim 2 wherein the calcium phosphate medium comprises particulate granules of less than 30µ diameter.

4. The method as specified in claim 2 wherein the calcium phosphate medium content of the suspension stabilizer is from 0.05%–5.0% by weight of the monomers used.

5. The method as specified in claim 1 wherein the oil soluble organic phosphite is selected from the group consisting of alkyl esters of phosphorous acid, esters of phosphorous acid with a lipophilic group having aromatic rings, and mixtures thereof.

6. The method as specified in claim 5 wherein the alkyl esters are selected from the group of myristyl esters of phosphorous acid, stearyl esters of phosphorous acid, lauryl esters of phosphorous acid, and mixtures thereof.

7. The method as specified in claim 5 wherein the lipophilic group is selected from the group consisting of lauryl phenyl, myristyl phenyl, and mixtures thereof.

8. The method as specified in claim 1 wherein the oil soluble organic phosphite is selected from the group consisting of tristearyl phosphite, distearyl phosphite, trilauryl phenyl phosphite, and mixtures thereof.

9. The method as specified in claim 5 wherein the phosphorous ester medium content of the suspension stabilizer is from 0.01%–20% by weight of the calcium phosphate medium used.

10. The method as specified in claim 1 wherein the vinyl monomer is selected from the group consisting of styrene, methyl methacrylate, acrylonitrile, vinyl chloride, vinylidene chloride, chlorostyrene, alpha-methyl styrene, and mixtures thereof.

11. The method of manufacturing polymer particles by the suspension polymerization of vinyl monomers in a substantially stabilized polymerization system wherein the suspension stabilizer includes a calcium phosphate medium selected from a group consisting of calcium monohydrogen phosphate, tricalcium phosphate, hydroxyl apatite, and mixtures thereof, the suspension stabilizer having a calcium phosphate medium content of from 0.05% to 5.0% by weight of the monomers used, and an oil soluble organic phosphite selected from a group consisting of myristyl esters of phosphorous acid, stearyl esters of phosphorous acid, lauryl phenyl esters of phosphorous acid, myristyl phenyl esters of phosphorous acid, and mixtures thereof, the suspension stabilizer having an oil soluble organic phosphite content of more than 0.01% and less than 20% by weight of the calcium phosphate medium used.

12. The method as specified in claim 11 wherein the oil soluble organic phosphite is selected from the group consisting of tristearyl phosphite, a distearyl phosphite, trilauryl phenyl phosphite, and mixtures thereof.

References Cited

FOREIGN PATENTS 977,889  12/1964  Great Britain.

HARRY WONG, JR., Primary Examiner

U.S. Cl. X.R.

260—86.1, 86.7, 87.5, 88.1, 87.7, 88.7, 89.5, 91.5, 91.7, 92.8, 93.5

UNITED STATES PATENT OFFICE
CERTIFICATE OF CORRECTION

Patent No. 3,493,551                         February 3, 1970

Eiji Aoishi et al.

It is certified that error appears in the above identified patent and that said Letters Patent are hereby corrected as shown below:

Column 2, line 37, after "vinyl" insert -- chloride --; line 56, the formula should appear as shown below:

$$3(Ca_3(PO_4)_2 \cdot Ca(OH)_2.$$

Column 3, line 71, before "as", second occurrence, insert -- and --. Column 4, Table 1, third column, insert -- total --, between "weight" and "monomers". Column 5, line 41, "has" should read -- as --. Column 6, line 3, "1.0 g" should read -- 0.1 g --.

Signed and sealed this 7th day of July 1970.

(SEAL)
Attest:

EDWARD M. FLETCHER, JR.               WILLIAM E. SCHUYLER, JR.
Attesting Officer                      Commissioner of Patents